US006301766B1

(12) United States Patent
Kollé

(10) Patent No.: US 6,301,766 B1
(45) Date of Patent: Oct. 16, 2001

(54) METHOD FOR METAL WORKING USING HIGH PRESSURE FLUID PULSES

(75) Inventor: Jack J. Kollé, Seattle, WA (US)

(73) Assignee: Tempress Technologies, Inc., Kent, WA (US)

( * ) Notice: Subject to any disclaimer, the term of this patent is extended or adjusted under 35 U.S.C. 154(b) by 0 days.

(21) Appl. No.: 09/228,453

(22) Filed: Jan. 11, 1999

Related U.S. Application Data

(60) Provisional application No. 60/071,205, filed on Jan. 12, 1998, and provisional application No. 60/071,126, filed on Jan. 12, 1998.

(51) Int. Cl.[7] .............................. B23P 17/00; B21D 39/00; B21J 15/02
(52) U.S. Cl. ..................... 29/421.2; 29/421.1; 29/522.1; 29/525.06
(58) Field of Search ................................ 29/421.1, 522.1, 29/521, 523, 525.06, 469.5, 458, 421.2; 411/19

(56) References Cited

U.S. PATENT DOCUMENTS

| 2,342,732 | * | 2/1944 | Gudmundsen | 411/19 |
|---|---|---|---|---|
| 2,359,629 | * | 10/1944 | Dexter et al. | 411/19 |
| 2,421,769 | * | 6/1947 | Wolfe | 29/421.2 |
| 2,445,803 | * | 7/1948 | Rogers | 218/29 |
| 2,492,605 | * | 12/1949 | Varney et al. | 411/19 |
| 2,535,079 | * | 12/1950 | Lebert | 218/29 |
| 2,543,063 | * | 2/1951 | Rogers | 218/29 |
| 2,562,721 | * | 7/1951 | Jakosky | 218/29 |
| 2,562,724 | * | 7/1951 | Lebert | 411/19 |
| 3,520,225 | * | 7/1970 | Baugh | 411/19 |
| 3,655,424 | * | 4/1972 | Orowan | 29/458 |
| 4,190,202 | * | 2/1980 | Yie | 239/101 |
| 4,573,637 |   | 3/1986 | Pater et al. | 239/11 |
| 4,762,277 |   | 8/1988 | Pater et al. | 239/99 |
| 4,862,043 |   | 8/1989 | Zieve | 318/114 |
| 4,863,101 | * | 9/1989 | Pater et al. | 239/99 |
| 4,925,510 | * | 5/1990 | Hojo et al. | 156/92 |
| 4,928,509 | * | 5/1990 | Nakamura | 29/421.1 |
| 5,000,516 |   | 3/1991 | Kolle et al. | 299/16 |
| 5,051,020 | * | 9/1991 | Schleicher | 29/522.1 |
| 5,121,537 | * | 6/1992 | Matsui et al. | 29/522.1 |
| 5,953,809 | * | 9/1999 | Kowalski | 29/521 |

\* cited by examiner

*Primary Examiner*—P. W. Echols
*Assistant Examiner*—Marc Jimenez
(74) *Attorney, Agent, or Firm*—Ronald M. Anderson

(57) ABSTRACT

Methods and apparatus employing an ultra high-pressure fluid pulse to perform metal working operations, including joining and cold working. In one application, an ultra high-pressure fluid pulse is directed into a hollow rivet that is seated within an orifice formed in two metal sheets, causing the fastener to expand outwardly, in an interference fit with the orifice that joins the metal sheets together. The ultra high-pressure fluid pulse can alternatively be applied to the metal sheets to plastically deform them into a cavity to form a clinch fastener joint. Further, the ultra high-pressure fluid pulse is usable to plastically deform the interface between stacked metal sheets or other components into surface features that are provided on one of the sheets, to form a mechanical interlock. Metal or ceramic powders placed between the metal sheets can be used to cause melting of the surfaces of the sheets at their interface upon the application of an ultra high-pressure fluid pulse, thus welding the sheets together with a tack weld. An ultra high-pressure fluid pulse can also be used to cold work an orifice in a metal component, thereby increasing the fatigue life around the orifice by introducing a residual compressive stress in a thin surface layer of the metal. An ultra high-pressure fluid pulse generator includes a fast acting valve that opens to enable an ultra high-pressure pulse to pass through a nozzle. A tapered fluid channel in the nozzle can substantially accelerate the ultra high-pressure fluid pulse.

44 Claims, 9 Drawing Sheets

METHOD FOR METAL WORKING USING HIGH PRESSURE FLUID PULSES

RELATED APPLICATION

This application is a continuation in part of U.S. provisional patent applications Ser. Nos. 60/071,205 and 60/071,126, both filed on Jan. 12, 1998, the benefit of the filing date of which is hereby claimed under 35 U.S.C. §§119(e) and 120.

FIELD OF THE INVENTION

This invention relates to methods and apparatus for using an ultra high-pressure fluid pulse for metal working applications, and more specifically to methods and apparatus for applying such a pulse to fastening operations, to pulse bonding, to clinch formation fastening, to cold working of orifices, and to cold working a metal surface in a manner similar to peening.

BACKGROUND OF THE INVENTION

Rivets are a preferred fastener for use in assembling aluminum and titanium airframe components because they provide a joint having a high shear strength. This strength arises from the interference fit between a rivet and the components it joins. Commercial aircraft incorporate millions of riveted joints. Riveting is the largest single cost operation associated with airframe manufacturing. In addition, rivets are also the fastener of choice for use in producing automobile and truck bodies, mobile homes, and light rail vehicles.

The conventional impact riveting process is time consuming and causes repetitive stress health problems related to operator handling of impact tools. This process often requires two operators, positioned on opposite sides of the work piece, further increasing costs and limiting application of this process for joining components in structures having limited access. Hydraulic squeeze riveting technology avoids the repetitive stress injury associated with impact riveting, but this process typically employs large hydraulic tools, which are not readily adapted to join components in complex structures or to meet constantly changing productions needs. Achieving a reliable interference fit while riveting components requires match-drilled holes made with precise dimensional control.

A riveting process that does not require operators on both sides of the pieces being joined is referred to as blind hole fastening. Blind hole fastening has the attraction of potential tremendous labor cost savings. Existing blind hole fasteners are typically variations of some type of pull-through swaging process or use threaded expandable fasteners. These systems are all relatively complex, involving tapered sleeve mechanisms. The structural performance of multi-component fasteners of the type often used for blind hole joints is inherently inferior to a single piece fastener. There are currently no structural, blind-hole fasteners in widespread use for structural airframe manufacturing.

It would be desirable to develop a simple method for riveting, which uses compact, easy to manipulate tools, do not use multi-component fasteners, do not subject the operator to significant vibrational force, and which can be used for setting blind hole fasteners. Currently, such methods are not provided in the prior art.

While rivets are currently the preferred type of fastener for assembling aluminum and titanium airframe components, riveting is labor intensive and costly. Such a labor intensive process is poorly suited to high volume manufacturing applications. Aluminum welding is appropriate for some components, but this process requires skilled workers, careful quality control, and post processing to relieve stresses in the welded assembly. Explosive bonding of metal structures has been investigated as a means of directly bonding aluminum alloys. This process involves the detonation of high explosive sheets against plates of materials to be bonded. The high velocity impact of the two plates generates extremely high stresses at the material interface, allowing the materials to diffusion bond and interlock mechanically. This process is not suited for high volume continuous manufacturing of structures such as airframes and vehicles.

It would be desirable to develop an economical alternative to conventional riveting and the use of hydraulic riveting tools for joining two components that does not require the skill, or careful attention to quality control, and the post processing required for aluminum welding, and which is also well suited for high volume continuous manufacturing. Currently, such alternatives do not appear evident in the prior art.

Another prior art process for joining two components, which can be employed as an alternative to riveting, is to provide an interlocking clinch fastener between two components, such as two sheets of metal. Mechanical clinch forming has become accepted practice as an alternative to tack welding in a number of manufacturing applications, including the production of appliances, automotive, and general sheet metal fabrication (e.g., in the production of duct work and electrical fixtures). Mechanical clinch fastening systems that use a punch and die are well known and in common use.

Disadvantages of these prior art clinch forming methods are that they are limited to only being usable with highly ductile, relatively thin sheet steel and some aluminum alloys. Thicker steel alloys, structural aluminum, and titanium cannot be joined using existing clinch forming methods. Furthermore, the stiff, precisely aligned punch and die combination is not suited for large structures. The associated tooling generally comprises a very large, heavy, and expensive structure. The process cycle time is relatively slow, and only one size clinch may be formed by a specific tool. The process is limited to forming a circular clinch, which may not always be the desired shape. Finally, punch wear and breakage is a problem with mechanical clinch forming.

It would be desirable to provide a clinch forming method that does not suffer from the above-noted disadvantages. The method should preferably be suited to high volume and flexible manufacturing of large aluminum structures, such as appliances, ductwork, automobiles, trucks, recreational vehicles, and trailer homes; and should provide stronger joints than existing prior art techniques.

Mechanical cold-working of holes is currently used by aircraft manufacturers to improve the fatigue resistance of critical structures that are joined with rivets or other fasteners. Mechanical cold working of holes involves applying a radial force to the inside surface of the hole. The residual compressive stress resulting from plastic radial strain around cold-worked holes is known to result in an improved fatigue life for the hole. The conventional process of mechanical cold working of rivet holes includes the following steps. After the holes are drilled, a special gauge is inserted to verify hole dimensions. A disposable sleeve is placed in the hole and a hydraulically-actuated mandrel is drawn through the hole. The hydraulic pressure causes the mandrel diameter to expand while the mandrel is in the hole. A second inspection is performed to verify that the diameter is still within tolerance and that the proper expansion and desired cold working has occurred. It will be apparent that these steps comprise a time consuming, labor-intensive process.

It would be desirable to provide a method for the mechanical cold working of holes that is much less labor intensive. This new method should preferably be capable of forming and cold working holes in aluminum in a single step.

Over the past 20 years, surface impact treatment has emerged as an important technique to enhance the fatigue life of metal components by introducing a residual compressive stress in a thin surface layer. In particular, shot peening can significantly enhance the fatigue life of welded structures by eliminating the residual tensile stress that occurs due to thermal contraction at the weld toe. Shot peening is often used for surface impact treatment (as opposed to cleaning) and is carried out by directing a stream of small (typically under 1 mm) steel shot at a metal surface. One inherent disadvantage of this process is that it must be carried out in a confined space, because the shot ricochet wildly from the work piece in many directions. In addition, the process generates considerable metal dust and noise. As a result, shot peening is carried out as a batch process on assembled structures. In order to ensure a good surface finish, the shot must be clean, round, and free from broken material. Shot peening at the high velocities required for surface cold working results in breakage of a significant fraction of the shot; the broken shot must be removed and replaced at significant cost.

It would thus be desirable to develop a method for introducing a residual compressive stress in a thin surface layer of a piece, which can be carried out as a continual process, rather than a batch process, and which does not include the disadvantages of ricocheting or broken shot. Such a method can be integrated with robotic welding to provide weld stress relief and cold work following the welding operation. The prior art does not disclose such a method.

SUMMARY OF THE INVENTION

Each of the above-described processes for expansion fastening, pulse bonding, clinch formation fastening, cold working holes, and cold working metal surfaces can be carried out with an ultra high-pressure fluid pulse. Such a pulse can be generated by actuating a fast opening valve to release water or other similar fluids contained in a pressure vessel and compressed to ultra high-pressures of 100 MPa or more (such as disclosed in commonly assigned U.S. Pat. No. 5,000,516); however, other valve configurations suitable for producing such a pulse are contemplated to implement the present invention. The creation of ultra high-pressure fluid pulses requires a valve that opens very quickly to ensure that the leading edge of the pulse is traveling at high velocity before it impacts the work piece or enters a tapered nozzle for further acceleration.

In accord with the present invention, a method is defined for using an ultra high-pressure fluid pulse to join a plurality of components. The method employs an ultra high-pressure fluid pulse generator having an outlet adapted to direct the ultra high-pressure fluid pulse at a surface of one of the plurality of components to be joined. The components are positioned in a desired configuration, and the ultra high-pressure fluid pulse generator is disposed so that the ultra high-pressure fluid pulse is directed at the surface of one of the components. The ultra high-pressure fluid pulse is generated and applied to the surface of one of the components, causing a localized deformation of at least the one component to join and fasten the plurality of components together.

In one application of this method, the one component comprises a fastener having a cavity into which the ultra high-pressure fluid pulse is applied. The other components (e.g., two stacked metal sheets) include aligned orifices in which the fastener is disposed during the step of positioning the plurality of components. The ultra high-pressure fluid pulse causes the fastener to expand outwardly into an interference fit within the orifices to join and fasten the plurality of components together.

When generating the ultra high-pressure fluid pulse, a valve in the ultra high-pressure fluid pulse generator is rapidly opened to release the ultra high-pressure fluid into a channel directed toward the surface of one of the plurality of components. The ultra high-pressure fluid pulse generator preferably consists of a pressure vessel filled with a fluid at a pressure of greater than 100 MPa. The fluid is preferably water or a mixture that includes water.

Also provided in the ultra high-pressure fluid pulse generator is a nozzle through which the ultra high-pressure fluid pulse is directed toward the surface of one of the plurality of components. A length of the nozzle determines a duration of the ultra high-pressure fluid pulse.

In another application of this method, the ultra high-pressure fluid pulse causes a plastic deformation at an interface between at least two of the plurality of components. A structure is preferably provided to support the plurality of components. A magnitude of a shock pressure of the ultra high-pressure fluid pulse used in this application is preferably greater than about 1 GPa. In one embodiment, at the interface between the components, they each have a surface that is substantially smooth. In another embodiment, a surface of at least one of the two components is textured to facilitate bonding the components. As a further variation, at the interface, a surface of at least one of the components can include a cavity, so that an impulsive loading applied to the interface above the cavity by the ultra high-pressure fluid pulse forms a tack joint. In yet another embodiment, at the interface between the components, a surface of at least one of the components includes a channel, so that an impulsive loading applied above the channel by the ultra high-pressure fluid pulse forms a seam.

Yet another embodiment includes the step of positioning an intermediate material at the interface between the components, to enhance bonding between them in response to the ultra high-pressure fluid pulse. If the intermediate material is sufficiently hard, the ultra high-pressure fluid pulse interpenetrates surfaces of the at least two components, forming a mechanical joint. If the intermediate material is a powder, upon being subjected to an impulsive loading produced by the ultra high-pressure fluid pulse, the surfaces of the components melt, bonding the surfaces together. The powder may comprise ceramic particles, or metal particles in a different embodiment.

Another embodiment of this method requires that a cavity be disposed behind a rear component, opposite a point where the ultra high-pressure fluid pulse is applied to the surface of the top component. This ultra high-pressure fluid pulse forces the plurality of components into the cavity to form an interlocking clinch fastening. Preferably, a shock pressure produced by the ultra high-pressure fluid pulse has a magnitude greater than 1 GPa. It is also preferred that the ultra high-pressure fluid pulse be applied to an area on the surface that is not greater than that of an inlet into the cavity to encourage thinning of a center of the interlocking clinch fastening and formation of a thick-walled interlock, with minimum shear in a load bearing section of the interlocking clinch fastening. The cavity can be formed in a supporting structure that underlies the plurality of components being joined. Or, the cavity can be in a die that is mounted on the supporting structure.

Another aspect of the present invention is directed to a method for using an ultra high-pressure fluid pulse to cold-work metal by introducing a residual compressive stress in the metal, thereby increasing an expected fatigue life of the metal. Still another aspect of the invention relates to apparatus for applying an ultra high-pressure fluid pulse to a component to produce a localized plastic deformation. This apparatus includes a discharge valve that is rapidly selectively moved from a closed to an open position to enable a pressurized fluid in a high-pressure chamber formed within a housing of the valve to travel down a fluid channel in the nozzle to an outlet port formed at a distal end of the nozzle. This ultra high-pressure fluid pulse is employed generally as described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Using Ultra High-pressure Fluid Pulses to Expand Hollow Fasteners

Figure 1:
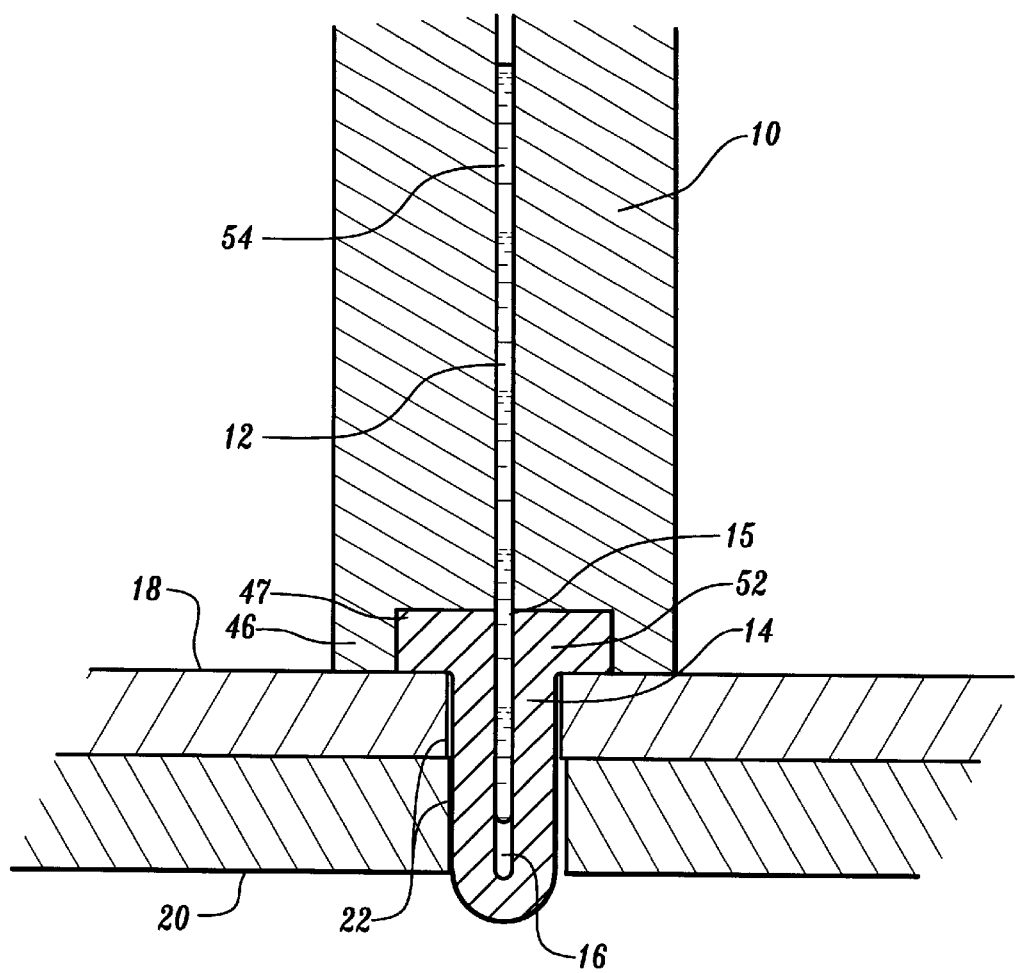
FIG. 1 is a schematic view showing an ultra high-pressure fluid pulse being applied to a hollow fastener.

One aspect of the present invention is a method for joining two materials by using an ultra high-pressure fluid pulse to expand a hollow fastener. FIG. 1 illustrates an ultra high-pressure fluid pulse being used to expand a hollow fastener to join two sheets of metal. A nozzle 10 of an ultra high-pressure fluid pulse generating tool is shown positioned over a hollow fastener 14. Hollow fastener 14 includes a relatively small diameter cavity 15, which extends part way through the body of the fastener, toward a bottom 16. Hollow fastener 14 has a head 52. A distal end 46 of nozzle 10 incorporates a cavity 47 that is adapted to seat over the head 52 of hollow fastener 14. An ultra high-pressure fluid pulse 12 is shown advancing down a constant diameter fluid channel 54 in nozzle 10, towards hollow fastener 14. Cavity 47 both directs ultra high-pressure fluid pulse 12 into cavity 15 in hollow fastener 14 (substantial leakage would tend to reduce the shock pressure applied to cavity 15) and also prevents head 52 of hollow fastener 14 from expanding.

Hollow fastener 14 is disposed in an orifice 22 that has been formed, e.g., by a drilling or a die punching operation, in both a metal sheet 18 and a metal sheet 20. In this Figure, an ultra high-pressure fluid pulse 12 is shown advancing through nozzle 10 into cavity 15 within hollow fastener 14.

Figure 2:
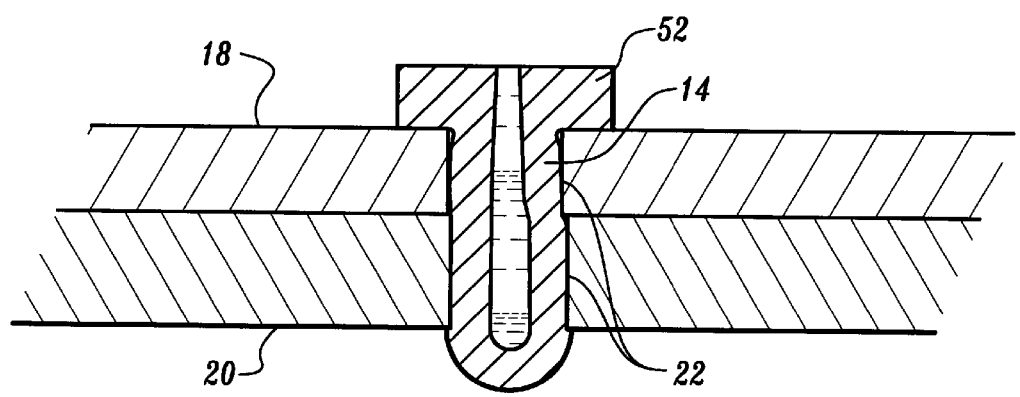
FIG. 2 is a schematic view showing a hollow fastener that has been expanded to join two metal sheets by the application of an ultra high-pressure fluid pulse.

FIG. 2 shows the result of ultra high-pressure fluid pulse 12 impacting the bottom 16 of hollow fastener 14. Hollow fastener 14 is inelastically expanded outwardly within orifice 22, so that hollow fastener 14 interferes with metal sheet 18 and metal sheet 20. The force causing the inelastic expansion of hollow fastener 14 is created when ultra high-pressure fluid pulse 12 impacts the bottom 16 of cavity 15 in hollow fastener 14. The sudden arrest of the ultra high-pressure fluid pulse creates a shock pressure pulse that inelastically expands hollow fastener 14. Because the diameter of cavity 15 is small, the impact force on the fastener is relatively small, and the fastener joint can be formed without supporting the back side of the components being joined.

Figure 3:
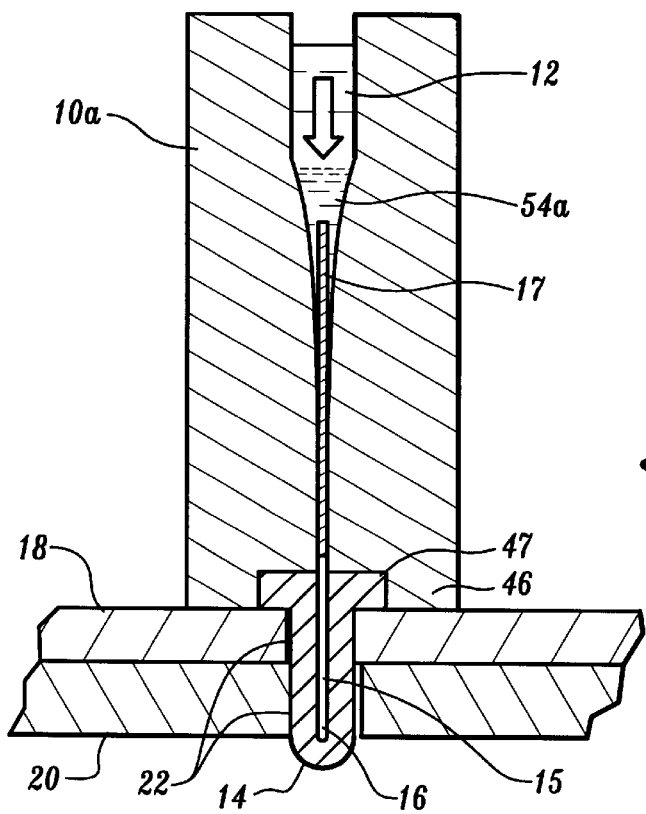
FIG. 3 is a schematic view showing an ultra high-pressure fluid pulse being applied to inject a pin into a hollow fastener.

FIG. 3 illustrates an embodiment of the present invention in which a soft metal or plastic pin 17 is initially disposed within a discharge nozzle 10a. Pin 17 is formed of a material that is chosen to have a yield strength substantially less than the force produced by the high pressure fluid pulse. Pin 17 has a diameter substantially equal to the diameters of nozzle exit 46 and cavity 15 in the fastener. FIG. 3 shows that nozzle 10a includes a tapered fluid channel 54a. This tapered fluid channel accelerates high-pressure fluid pulse 12, thereby increasing the shock pressure applied to drive pin 17 into hollow fastener 14. A non tapered nozzle may be used, so long as the magnitude of the fluid pressure pulse is great enough to cause the inelastic expansion of pin 17 within cavity 15.

Figure 4:
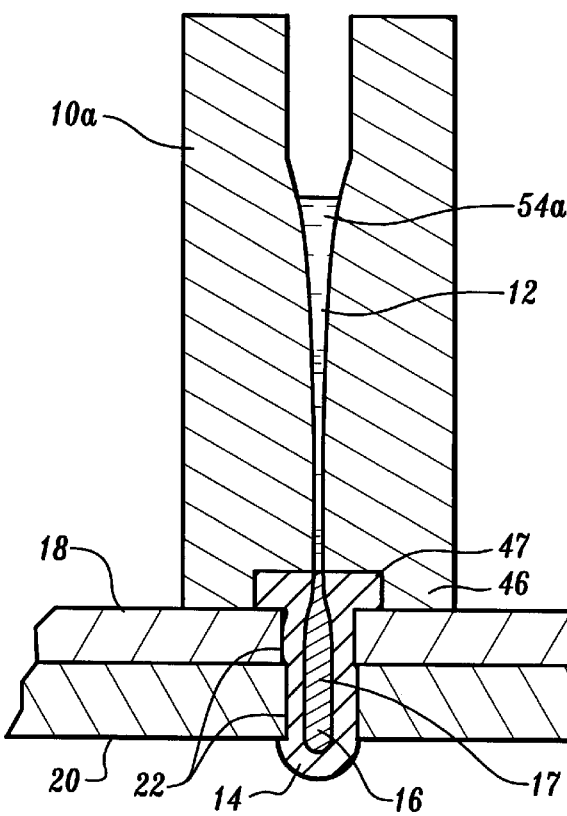
FIG. 4 is a schematic view showing a hollow fastener that has been expanded and filled by the pin injected due to the application of the ultra high-pressure fluid pulse shown in FIG. 3, for use in joining two metal sheets.

FIG. 4 illustrates how ultra high-pressure fluid pulse 12 has forced pin 17 into cavity 15 of hollow fastener 14. Pin 17 expands hydrodynamically, since its yield strength is much smaller than the for generated by the impact shock pressure that results when pin 17 impacts bottom 16 of cavity 15 in hollow fastener 14. The length of pin 17 is chosen so that the volume of pin 17 after its expansion equals the desired expanded volume of cavity 15. This feature results in a solid fastener (i.e., a fastener having a cavity that is now filled) that is more corrosion and fatigue resistant than a hollow fastener. If hollow fastener 14 is formed of aluminum or an aluminum alloy, pin 17 preferably also comprises aluminum or an aluminum alloy.

The pressure, P, required to expand a thick-walled cylinder made of an elastic-perfectly plastic material is:

$$P_i = \sigma_p \ln K, \tag{1}$$

where $\sigma_p$ is the plastic flow stress and K is the ratio of the outer to inner diameter of the cylinder. For the purposes of this discussion, the plastic flow stress in work-hardening alloys is approximated as yield stress at 10% strain.

For joining aluminum airframes a rivet alloy, such as 7050, is suitable, while a titanium rivet alloy, such as Ti-6Al-4V, would be used for fastening titanium. A relatively soft 2000-series alloy, such as 2024, would be appropriate for fabricating truss-head fasteners used to join composite panels to metallic frames. Table 1, which follows, lists plastic flow stresses for these three high-performance aerospace alloys, with the capacity for up to 10% ductile strain.

Table 1 includes expansion pressures for a diameter ratio of 10, which corresponds to the expansion of a 1 mm diameter cavity in a 9.5 mm diameter cylinder; a pressure of 2.3 times the plastic flow stress is required. At this strain level, the fastener should expand to fill a 10.5-mm diameter orifice in an interference fit. Typical expansion of a conventional rivet is only 1%, so the present invention offers the ability to fasten materials with an expanded rivet, with much larger dimensional-tolerances for the orifice in which the rivet is expanded. Table 1 also includes the impact force, $F_i$, on the fastener, which is equal to the product of the impulse pressure and the transverse cross sectional area of the cavity. Since the cavity diameter is relatively small, the impact force is two orders of magnitude smaller than the 100 kN force required for conventional rivet upset.

TABLE 1

| Material | $\sigma_p(\epsilon_p = 10\%)$, MPa | $P_i(K = 10)$, MPa | $F_i(d_o = 1\text{ mm})$, N |
|---|---|---|---|
| 2024 Aluminum T3 | 420 | 966 | 760 |
| 7050 Aluminum | 550 | 1265 | 992 |
| Ti-6Al-4V | 1034 | 2378 | 1864 |

A typical hydraulic pulse generator can produce a 300 MPa jet. The shock pressure for a fluid jet that is suddenly arrested in a rigid tube can be determined from the Rankine-Hugoniot equation, which relates initial particle velocity, $u_o$, to impact shock pressure, p:

$$u_o = \frac{p}{\rho_o c_o u_{o_1}} \left( \frac{\rho}{\rho_o} - 1 \right), \tag{2}$$

where $\rho_o$ is the fluid density ahead of the shock, $c_o$ is the sound speed in the unshocked fluid and $\rho$ is the fluid density behind the shock front. Solving this equation requires an equation of state for the fluid. The Tate equation of state for water is a useful approximation at high pressures:

$$\frac{\rho}{\rho_o} = \left(1 + \frac{p}{\alpha \rho_o c_o^2}\right)^\alpha \tag{3}$$

where $\alpha = 0.13986$.

The discharge velocity from a compressed-water-pulse generator is related to the discharge pressure, $p_d$, by Bernoulli's equation for a free jet discharge:

$$u_o = \sqrt{\frac{2 p_d}{\rho_o}}. \tag{4}$$

A relatively small discharge pressure is capable of generating extremely high shock pressures. For example, a 300 MPa pulse generator can generate over 2 GPa water shock pressure, which is capable of easily expanding rivets made of any alloy listed in Table 1.

Ultra High-Pressure Pulse Generating Tool

Figure 5:
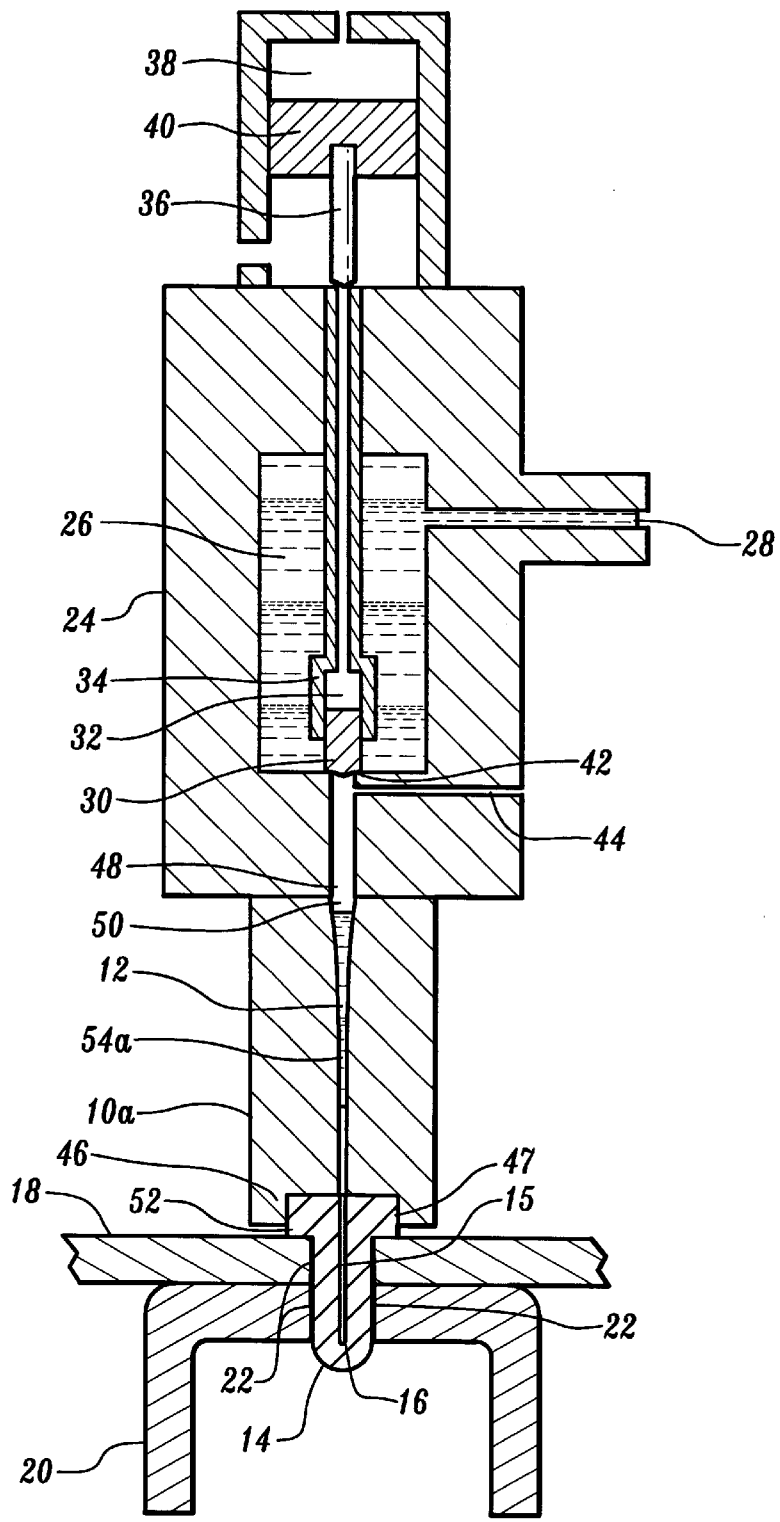
FIG. 5 is a schematic view of an apparatus for applying an ultra high-pressure fluid pulse that is being used to expand a hollow fastener to join two metal sheets.

FIG. 5 illustrates one preferred embodiment of apparatus usable to create ultra high-pressure fluid pulse 12. An ultra high-pressure fluid pulse generating tool 24 is shown positioned over hollow fastener 14, which is in turn positioned within orifice 22 formed within metal sheet 18 and metal sheet 20. Tapered fluid channel 54a extends longitudinally through the center of the end of ultra high-pressure fluid pulse generating tool 24 and into tapered nozzle 10a, and a nozzle inlet 50 is in fluid communication with an outlet 48 of an ultra high-pressure fluid chamber 26. This ultra high-pressure fluid chamber is disposed internally within the ultra high-pressure fluid pulse generating tool. The diameters of outlet 48 and nozzle inlet 50 are identical. The diameter of fluid channel 54a is tapered to decrease toward nozzle outlet 46, thereby increasing the velocity of ultra high-pressure fluid pulse 12, and increasing the magnitude of the shock pressure created when ultra high-pressure fluid pulse 12 impacts the bottom 16 of cavity 15 in hollow fastener 14.

A relatively small diameter drain channel 44, which extends radially outward from above outlet 48, is preferably connected to a vacuum chamber (not shown), so that the fluid channel may be drained of fluid between successive pressure pulses. Draining fluid channel 54a between pulses is important to achieve consistent pulses of the desired magnitude. If fluid channel 54a is not drained, ultra high-pressure fluid pulse 12 will be reduced in magnitude.

A discharge poppet valve 30 is held closed by hydraulic fluid pressure applied to a poppet vent cavity 32. Discharge poppet valve 30 is seated on a valve seat 42 in a closed position of the discharge poppet valve, so that fluid from an ultra high-pressure fluid chamber 26 is blocked from entering fluid channel 54a. Ultra high-pressure fluid chamber 26 is in fluid communication with a high-pressure source (not shown) via a radially outwardly extending inlet port 28. When discharge poppet valve 30 is closed, the pressure source will continue to pump fluid into sealed ultra high-pressure fluid chamber 26, further pressurizing the working fluid. At ultra-high-pressures, generally considered to be greater than 100 MPa, water is slightly compressible. For example, water is compressed about 10% at a pressure of 300 MPa. Water is the preferred fluid for use in the present invention, but it is also contemplated that oil, an oil/water mixture, and other fluids may alternatively be used. The pressure of the fluid in ultra high-pressure chamber between pulses preferably exceeds 100 MPa.

Discharge poppet valve 30 has a greater diameter than valve seat 42, which permits the fluid pressure in ultra high-pressure fluid chamber 26 to rapidly move discharge poppet valve 30 away from valve seat 42 when the hydraulic pressure applied to discharge poppet valve 30 at poppet vent cavity 32 is removed. This type of fast opening valve arrangement is disclosed in detail in commonly held U.S. Pat. No. 5,000,516, the disclosure and drawings of which are hereby specifically incorporated herein by reference. Use of a fast opening valve in an ultra high-pressure fluid pulse generating tool is critical to creating an ultra high-pressure fluid pulse.

Discharge poppet valve 30 is free to move axially inside a sleeve 34. Sleeve 34 is connected to a vent poppet valve 36, which is coupled to a piston 40 that is driven to hold the vent poppet valve closed by hydraulic fluid pressure applied to the piston in a vent chamber 38. The hydraulic fluid in poppet vent cavity 32 is released when a solenoid-actuated valve (not shown) vents the hydraulic fluid pressure from vent chamber 38, allowing piston 40 to move vent poppet valve 36 to its open position. Once vent poppet valve 36 is open, discharge poppet valve 30 becomes unbalanced. Since the pressure in ultra high-pressure fluid chamber 26 is extremely high, discharge poppet valve 30 opens rapidly. As discharge poppet valve 30 opens, ultra high-pressure fluid pulse 12 is released from ultra high-pressure fluid chamber 26 and advances down tapered fluid channel 54a into hollow fastener 14. This cycle is repeated to generate successive ultra high-pressure fluid pulses.

It is also contemplated that different valve configurations can be used to generate ultra high-pressure fluid pulses in accord with the present invention. Any valve employed for this purpose must be capable of rapidly opening and closing. While FIG. 5 illustrates nozzle outlet 46 as including cavity 47, ultra high-pressure fluid pulse generating tool 24 may be used for other purposes, including pulse bonding, clinch forming and cold working in which cavity 47 is not needed. For these other applications, the nozzle outlet is preferably formed to have a relatively flat end (see for example, a nozzle outlet 46a as shown in FIGS. 6A, 6B, 8A, 8B, 10A, 10B, 11–13, 14A, 14B, 15, 16A, and 16B).

It should be noted that an ultra high-pressure fluid pulse generating tool may be configured with a straight fluid channel (i.e., fluid channel 54) or with a tapered fluid channel (i.e., tapered fluid channel 54a) in the nozzle. A tapered fluid channel accelerates ultra high-pressure fluid pulse 12. The need to incorporate a tapered fluid channel in the nozzle depends on the shock pressure magnitude required for a particular application. The shock pressure magnitude required for a given application depends on the material that the components to which the shock pressure is being applied are comprised. In general, for example, aluminum requires a lower shock pressure than titanium. The shock pressure magnitude is also dependent upon the position of the ultra high-pressure generating tool relative to the components being worked with the fluid pressure pulse. If the outlet of the nozzle substantially abuts the component being worked, the ultra high-pressure fluid pulse acts is confined in nozzle and cannot readily leak out at the interface with the component, which has the effect of maintaining the shock pressure compared to an ultra high-pressure fluid pulse that is applied to the component as a free jet, i.e., with the nozzle spaced apart from the component.

To determine whether a tapered fluid channel is required for a particular application, it is necessary to know: (1) the shock pressure required to work the particular material comprising a component that is to be worked; (2) the magnitude of the ultra high-pressure fluid pulse as it enters the fluid channel in the nozzle; and, (3) whether the nozzle outlet will abut the component to which the ultra high-pressure fluid pulse is being applied. In each of the embodiments discussed herein, for a specific fluid channel, an exemplary shock pressure is noted for successfully applying the invention to components of a specific material, such as aluminum.

Pulse Bonding Using Ultra High-pressure Fluid Pulses

Figures 6A, 6B:
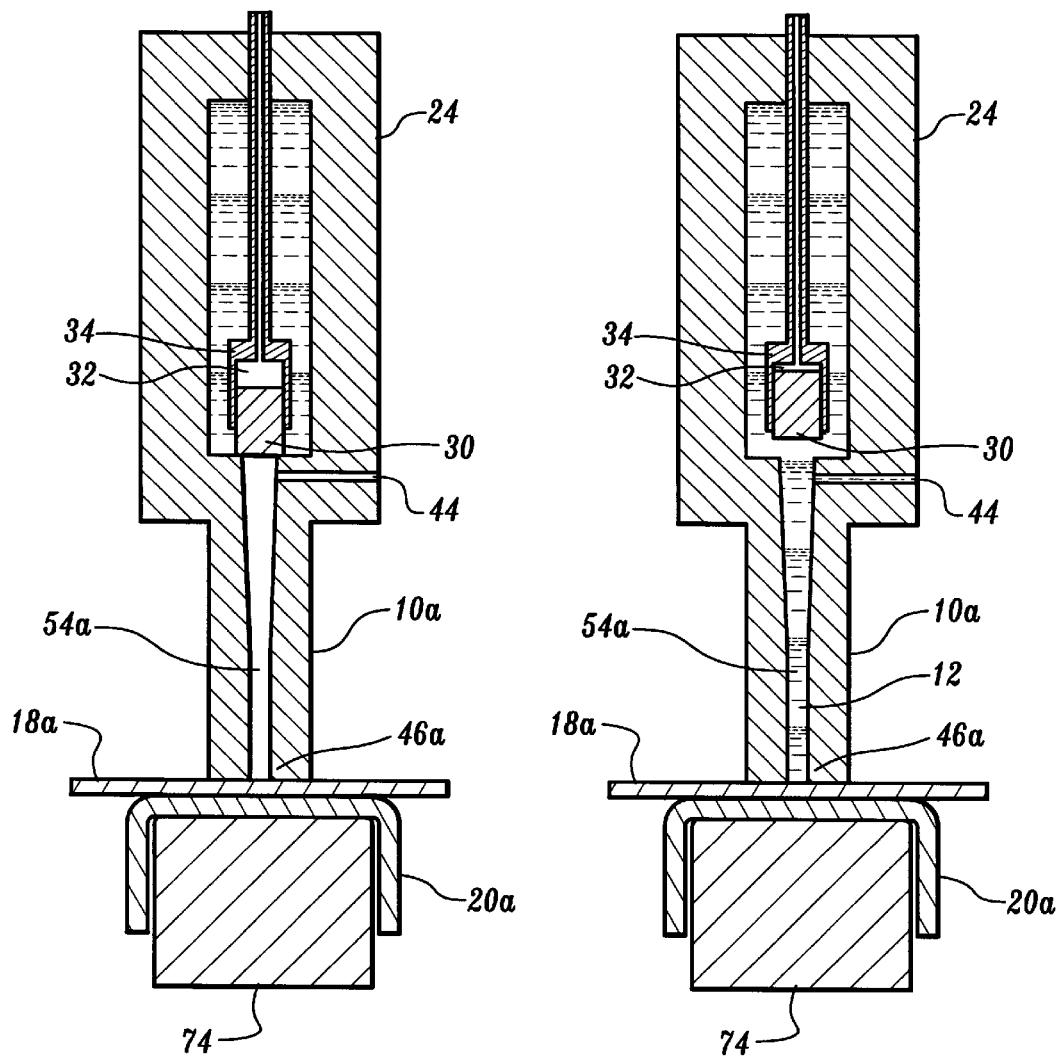
FIGS. 6A and 6B are schematic views illustrating use of an ultra high-pressure fluid pulse to bond two metal sheets by plastically deforming the metal comprising the sheets.

Another application of the present invention is directed to joining two materials using an ultra high-pressure fluid pulse to plastically deform the materials, thereby creating a bond at the interface between the materials. FIGS. 6A and 6B illustrate an ultra high-pressure fluid pulse generating tool 24 being used to apply ultra high-pressure fluid pulse 12 to a metal sheet 18a and a metal sheet 20a, which are supported by a support structure 74. Ultra high-pressure fluid pulse tool 24 as depicted in FIGS. 6A and 6B, directs an ultra high-pressure fluid pulse 12 against the surface of a substantially flat work piece (as opposed to a hollow fastener as depicted in FIG. 5). For this application, the ultra high-pressure generating tool includes a nozzle outlet 46a that seats substantially flush against metal sheet 18a. Any offset between the nozzle outlet and this surface should be substantially smaller than the nozzle outlet diameter.

Tapered nozzle 10a and tapered fluid channel 54a are depicted in FIGS. 6A and 6B to illustrate how the magnitude of the pressure pulse is amplified to impart sufficient shock pressure against metal sheets 18a and 20a to create a bond between the two components. The nozzle and fluid channel may alternatively be straight instead of being tapered, if the straight fluid path is capable of providing the required shock pressure. An analysis of the required shock pressure is provided below.

Note that the valve arrangement depicted in tool 24 is but one preferred embodiment of a fast opening valve that releases fluid from an ultra high-pressure chamber. high-pressure fluid pulse The method for pulse bonding two materials together requires that the pressure pulse generated by the ultra high-pressure fluid pulse generating tool have a stagnation pressure of at least 100 MPa so that the shock pressure created upon impact of pulse 54 against metal sheet 18a has a magnitude of at least 500 Mpa. This magnitude is sufficient to plastically deform the metallic materials to create a bond between them.

Figure 7A:
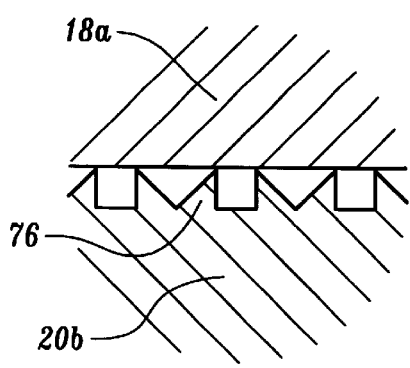
FIGS. 7A and 7B are schematic views illustrating texturing of the surface of one of two metal sheets to enhance the bond formed after an ultra high-pressure fluid pulse has caused the metals to plastically deform.
Figure 7B:
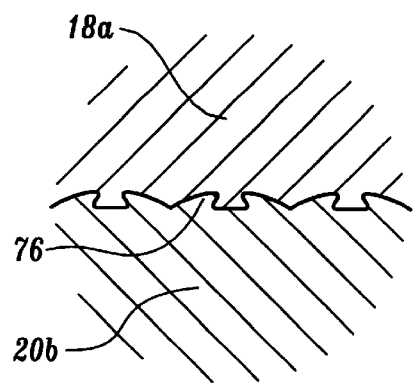

FIGS. 7A and 7B illustrate an embodiment of the pulse bonding method in which one of the surfaces of the materials to be bonded has been machined to improve the bonding process. As shown in FIG. 7A, metal sheet 18a has a smooth lower surface in contact with a metal sheet 20b. In contrast, the surface of metal sheet 20b has small surface groove and channel features 76 formed therein. FIG. 7B illustrates the inter-locking deformation of the surface groove and channel features 76 after the ultra high-pressure fluid pulse has been applied by ultra high-pressure fluid pulse generating tool 24. It will be apparent that providing surface groove and channel features 76 substantially enhances the mechanical interlock between metal sheets 18a and 20b that results from application of the ultra high-pressure fluid pulses to the surface of metal sheet 18a.

Figure 8A:
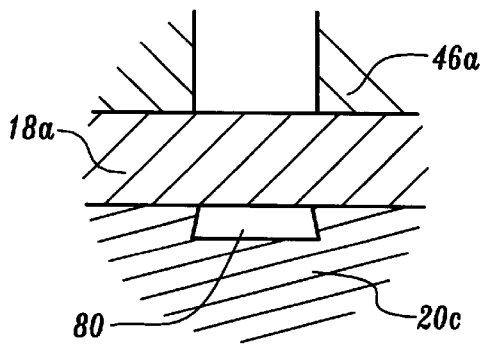
FIGS. 8A and 8B are schematic views showing the texturing of the surface of one of two metal sheets to enhance the bond formed after the application of an ultra high-pressure fluid pulse has caused the metals to plastically deform.
Figure 8B:
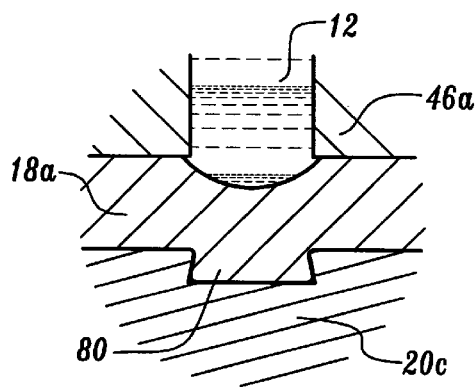

FIGS. 8A and 8B illustrate another embodiment in which a surface feature cavity 80 has been formed in the surface of a metal sheet 20c to further improve the mechanical interlock in the pulse bonding method. In these Figures, nozzle outlet 46a is shown abutted or seated substantially flush against metal sheet 18a. At the interface between metal sheet 18a and metal sheet 20c, metal sheet 18a has a smooth surface, while metal sheet 20c has surface feature cavity 80. FIG. 8B illustrates the deformation and bonding of the metal sheets caused by ultra high-pressure fluid pulse 12. Material from metal sheet 18a has been forced into the surface feature cavity 80 of metal sheet 20c by ultra high-pressure fluid pulse 12, creating an enhanced mechanical interlock between the two sheets. In this manner a tack joint may be formed. If the surface feature formed on metal sheet 20c is a channel instead of a cavity, a seam is formed by application of successive pressure pulses, rather than a tack joint.

Figure 9:
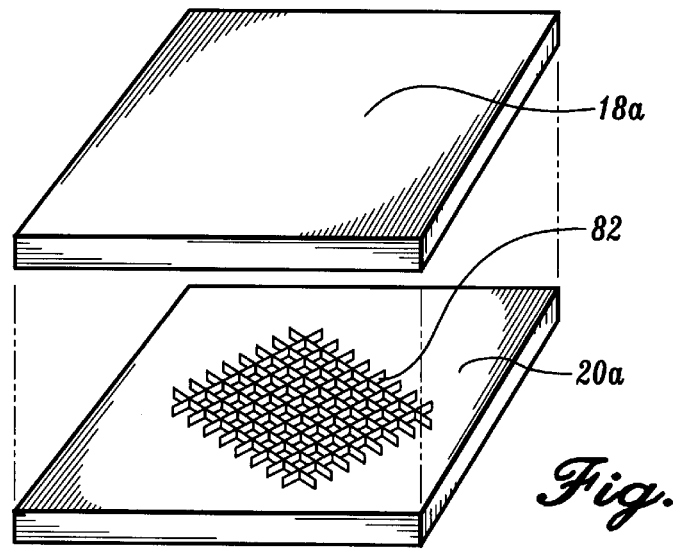
FIG. 9 is a schematic view illustrating the use of an intermediate material sandwiched between two metal sheets to enhance the bond formed by an ultra high-pressure fluid pulse.

FIG. 9 illustrates an embodiment in which a patch of an intermediate material 82 has been placed between metal sheet 18a and metal sheet 20a prior to application of the ultra high-pressure fluid pulse. Preferably, intermediate material 82 is a very hard material having a serrated surfaces. As metal sheet 18a and metal sheet 20a are forced together by ultra high-pressure fluid pulse 12, intermediate material 82 will interpenetrate both metal sheet 18a and metal sheet 20a, thereby interlocking the two sheets. Alternately, intermediate material 82 may be a material, which undergoes substantial compression at the high level of stress induced by the ultra high-pressure fluid pulse. A ceramic or metal powder undergoing a high stress, high strain deformation will experience substantial heating, resulting in local softening and melting of the adjacent metal component surfaces. Local softening and melting of these surfaces will result in localized welding and enhanced mechanical interlock between the metal sheets.

The stress distribution beneath a uniform pressure, P, distributed over a circular area of radius a, can be determined by superimposing the Boussinesq solution for stress beneath a point load. In this case, the maximum shear stress has a magnitude of $\tau_{max}=0.33P$ at $z=0.6a$.

Plastic yielding will initiate when the shear stress is about half the plastic flow strength, $\sigma_p$, which is taken as the average of the yield strength and the ultimate strength, and occurs when $P_{si}=1.5\ \sigma_p$. According to the Tresca yield criterion, the boundary of the plastic strain region will extend from the surface to a depth of 2.5a at a mean pressure $P_{sp}=5\ \sigma_p$. At intermediate pressures, the plastic flow is localized beneath the surface. Values for these plastic flow limit pressures are listed in Table 2 for a range of aluminum alloys. The plastic flow limit pressures represent a range of pressures where plastic flow occurs beneath the surface, but should not extend to the surface. In a preferred embodiment of the invention, the diameter of the opening of nozzle outlet 46a is between one and two times the thickness of metal sheet 18a in order to ensure that deformation is maximized near the interface between sheet 18a and sheet 20a.

TABLE 2

| Material | $\sigma_p$(0.2%), MPa | $P_{si}$, MPa | $P_{sp}$, MPa | Elongation % |
|---|---|---|---|---|
| 2024 Aluminum - T3 | 414 | 621 | 2070 | 18 |
| Annealed | 131 | 196 | 655 | 22 |
| 5083 Aluminum - H116 | 272 | 408 | 1360 | 16 |
| Annealed | 217 | 326 | 1085 | 22 |
| 6061 Aluminum - T6 | 293 | 440 | 1465 | 15 |
| Annealed | 90 | 135 | 450 | 25 |
| 7050 Aluminum - T76 | 507 | 761 | 2535 | 8 |
| 7075 Aluminum - T6 | 534 | 801 | 2670 | 11 |
| Annealed | 165 | 248 | 825 | 17 |

The shock pressure for a fluid jet that is suddenly arrested in a rigid tube has been discussed in detail above. As noted previously, a relatively small discharge pressure is capable of generating extremely high shock pressures. The shock pressure would have a duration related to the travel time of the shock wave, which is determined by the shock wave speed and nozzle length. The shock wave speed in water at this pressure is around 2000 m/s, which is relatively slow compared to the speed of sound in aluminum or other metals. A preferred nozzle design will have length of about 100 mm, resulting in a pulse duration of about 100 $\mu$s. This duration is still relatively long compared to the time required for sound to travel through the work piece. As long as the nozzle is longer than the stack of component being joined, the stress in the work piece should be essentially constant during the pulse.

Preferably a pulse generator operating at a pressures of 300 MPa will be used for joining components with this method. Such a device would generate over 2 GPa shock pressure pulse, which is capable of causing plastic shear in all of the aluminum alloys listed in Table 2. The presence of surface features on one of the components will cause localized stress risers leading to the deformation of the components at lower pressures. Since the shock pressures are high enough to cause plastic shear in intact material, these pressures will cause complete closure between the two components followed by additional plastic deformation.

Clinch Formation Using Ultra High Pressure Pulses

Figures 10A, 10B:
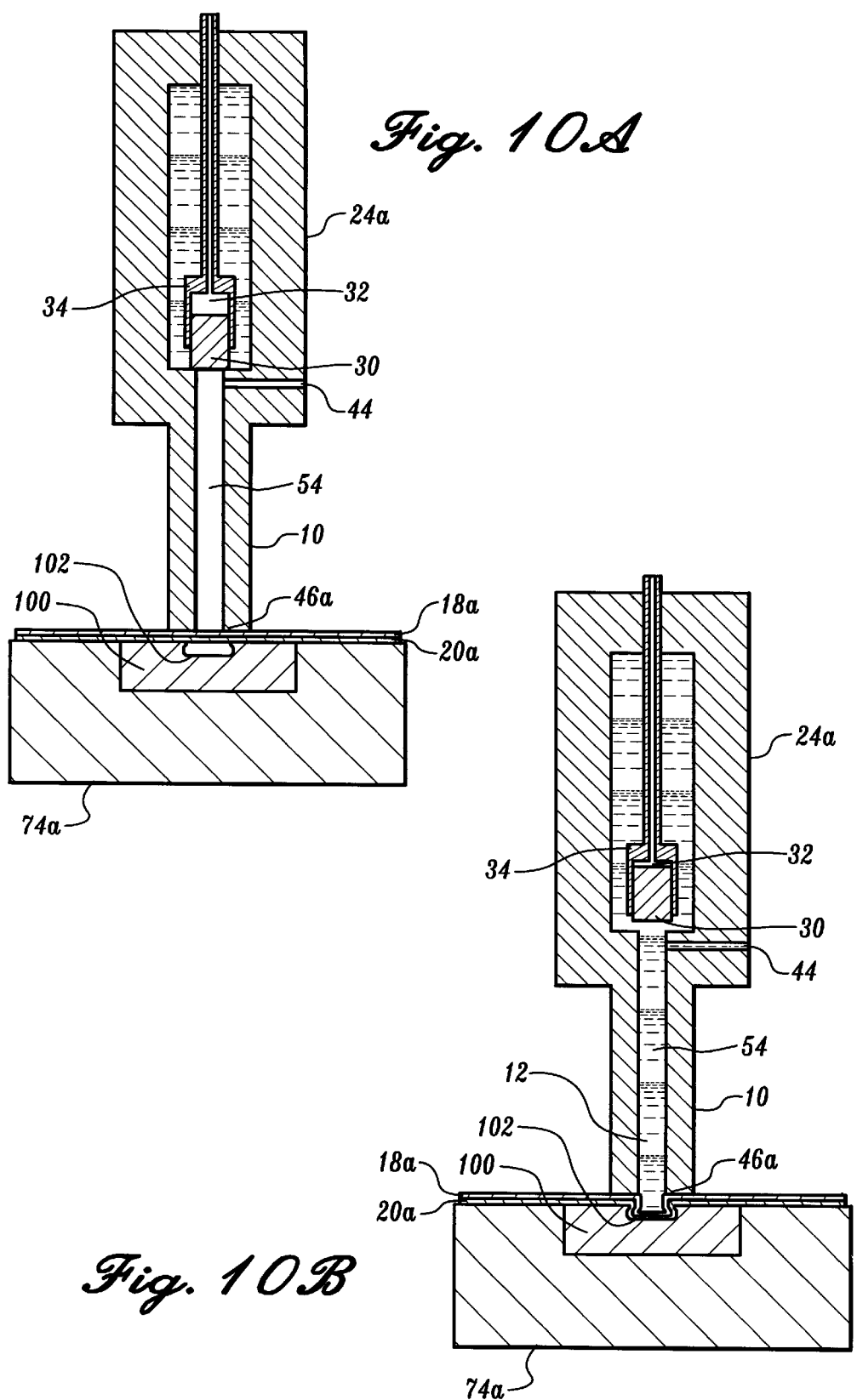
FIGS. 10A and 10B are schematic views showing an ultra high-pressure fluid pulse being used to bond two metal sheets by plastically deforming the metal sheets to form a clinch fastening.

Still another aspect of the present invention is directed to a method for joining two materials by using an ultra high-pressure fluid pulse to plastically deform the materials to create a clinch fastening. FIGS. 10A and 10B illustrate ultra high-pressure fluid pulse generating tool 24a being used to create a clinch-type fastening. The nozzle and fluid channel within the nozzle are not tapered in this exemplary embodiment of the tool, because the shock pressure employed for clinch fastening is sufficiently low that a tapered nozzle and tapered fluid channel will probably not be needed to increase the magnitude of the shock pressure produced by the fluid pulse. However, if desired, a tapered nozzle and tapered fluid channel may be used. Also, in this embodiment of the tool, nozzle outlet 46a abuts or seats flush against the surface of metal sheet 18a, or at a standoff distance above the surface that is much smaller than the diameter of the nozzle outlet.

In FIGS. 10A and 10B, metal sheet 18a and metal sheet 20a are shown disposed on a support structure 74a. In this embodiment, support structure 74a incorporates a die 100, which includes a cavity 102. Nozzle 10 of ultra high-pressure fluid pulse generating tool 24a is placed directly over cavity 102 with metal sheets 18a and 20a disposed between cavity 102 and nozzle 10. Ultra high-pressure fluid pulse 12 advances down fluid channel 54 and impacts metal sheets 18a and 20a, producing a shock pressure that forces the sheets into cavity 102, as illustrated in FIG. 10B.

Figure 11:
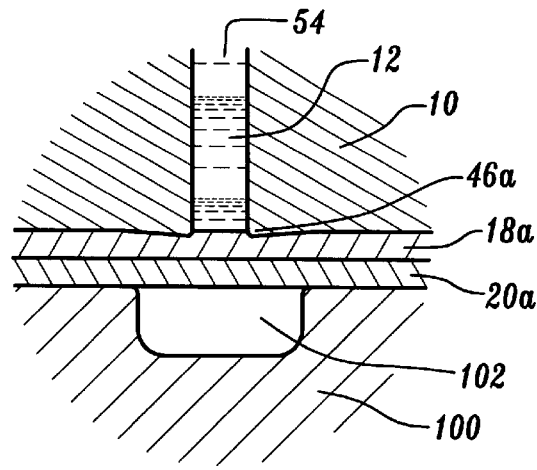
FIG. 11 is a schematic view of an ultra high-pressure fluid pulse directed toward two metal sheets that are placed over a cavity.
Figure 12:
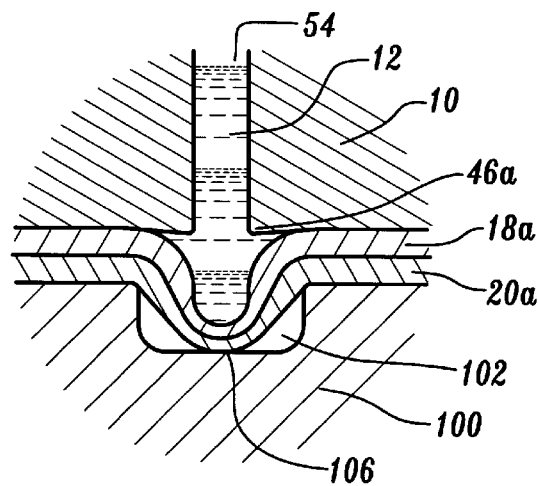
FIG. 12 is a schematic view of an ultra high-pressure fluid pulse immediately after it has impacted two metal sheets, causing the sheets to begin to plastically deform into a cavity.
Figure 13:
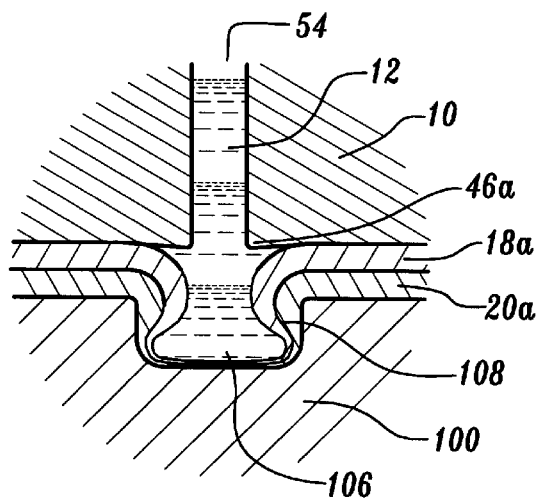
FIG. 13 is a schematic view of an ultra high-pressure fluid pulse that has impacted two metal sheets, causing a final plastic deformation of the sheets.

FIGS. 11, 12, and 13 show the interaction between the shock pressure produced by ultra high-pressure fluid pulse 12, metal sheets 18a and 20a, and cavity 102. FIG. 11 illustrates ultra high-pressure fluid pulse 12 advancing through fluid channel 54 in nozzle 10 towards metal sheets 18a and 20a. FIG. 12 shows the initial effect of ultra high-pressure fluid pulse 12 impacting metal sheets 18a and 20a. As shown, metal sheets 18a and 20a are being forced into cavity 102. Sheets 18a and 20a plastically deform until impacting a bottom 106 of cavity 102. FIG. 13 illustrates the final configurations of metal sheets 18a and 20a following this plastic deformation. After metal sheet 20a impacts the bottom 106 of cavity 102, the material of metal sheet 20a is further thinned. Hydraulic pressure expands the bottom of the clinch until it fills the cavity. This expansion insures that the upper metal sheet 18a wraps underneath the lower metal sheet 20a, forming a mechanical interlock 108. The thickness of the upper material at the interlock area determines the shear strength of the joint. In an alternate embodiment, cavity 102 may be formed directly into support structure 74a instead of in die 100.

The ultra high-pressure fluid pulse clinch forming process allows the formation of a significantly thicker shoulder interlock 108 and therefore, greater joint strength than a mechanical clinch fastening. The strain in the shoulder area is also much smaller than is produced with mechanical punch techniques, so that the technique can be applied to materials with lower ductility; particularly structural aluminum.

Preferably, the diameter of fluid channel 54 is smaller than the diameter of cavity 102 to ensure that the center of the clinch is thinned and forced downwardly, while the shoulders of the clinch remain relatively thick. A smaller nozzle outlet diameter also reduces the overall load on the work piece. A different nozzle having a different fluid channel diameter may be used for different clinch size fastenings and shapes, with the same ultra high-pressure fluid pulse generating tool 24a The cavity 102 may be circular or non circular. Non-circular or asymmetric clinch bonds provide greater resistance to joint rotation than circular clinch joints.

The stagnation pressure for a fluid jet, which is suddenly arrested in a rigid tube is determined by the Rankine Hugoniot shock equations discussed previously. The ultra high-pressure fluid pulse generator tool should be capable of generating a dynamic pressure pulse with a stagnation pressure of about half the charge pressure. A preferable tool designed for operation at 300 MPa would therefore produce a 150 MPa pulse with a peak velocity of 548 m/s. The shock pressure spike produced by this tool will have an amplitude of about 1100 MPa.

The clinch forming fastening process involves the finite strain of a thick plate with complex boundary conditions. A first order estimate of the pressures required to form the clinch can be obtained by evaluating the surface pressure required to induce plastic flow in an infinite half space as discussed previously. Values for limit pressures are listed in Table 2 for a range of aluminum alloys. The limit pressures provide a rough upper limit of the pressure required to initiate forming of a stack of plates with a thickness of 1.2 to 5 times the pressurized circle diameter.

A comparison of the plastic flow pressures listed in Table 2 indicates that an 1100 MPa water-hammer pressure spike, produced by the preferable 300 MPa pulse generator would be sufficient to initiate plastic deformation of clinches in a stack of material with a thickness comparable to or greater than the clinch diameter. Once deformation initiates, the center of the clinch will thin, leading to accelerated deformation and clinch formation.

Cold Working Holes Using Ultra High-pressure Fluid Pulses

Figure 14:
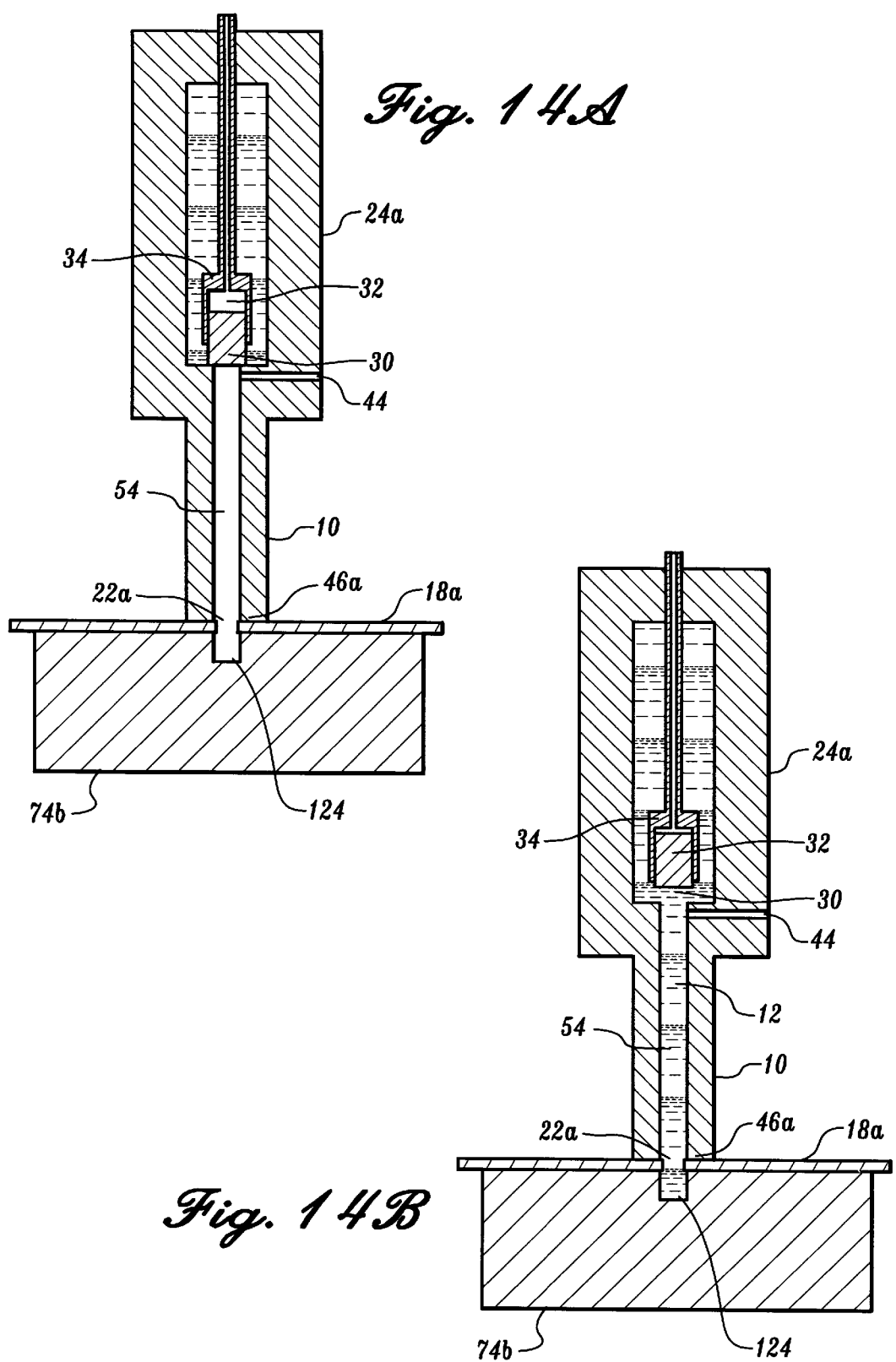
FIGS. 14A and 14B are schematic views of an ultra high-pressure fluid pulse being used to cold work a hole in a metal sheet to increase the fatigue life of the hole.

In accord with the present invention, an ultra high-pressure fluid pulse can also be used for cold working orifices in a metal material by causing a plastic radial strain around the orifice, thus producing a residual compressive stress that increases the fatigue life of the orifice. FIGS. 14A and 14B illustrate ultra high-pressure fluid pulse generating tool 24a in use for cold working an orifice 22a in metal sheet 18. Note that in the illustrated embodiment, the nozzle and the fluid channel extending through the nozzle are not tapered, because the shock pressure required for cold working an orifice will probably not require that the magnitude of the shock pulse be increased. However, if desired (or necessary due to other parameters), a tapered nozzle and tapered fluid channel may be used. Nozzle outlet 46a is abutted or seated substantially flush against metal sheet 18, or at a slight standoff.

In this application of an ultra high-pressure fluid pulse, metal sheet 18 is placed on a support structure 74b. Support structure 74b includes a blind hole 124. Metal sheet 18 has an orifice 22a and is positioned on support structure 74b so that the orifice is located directly over blind hole 124 in support structure 74b. Ultra high-pressure fluid pulse generating tool 24 is positioned so that nozzle 10 is located directly over orifice 22a and blind hole 124.

When discharge poppet valve 30 is in its closed position, fluid channel 54 is empty, but when discharge poppet valve 30 is lifted to its open position, ultra high-pressure fluid pulse 12 enters fluid channel 54 and advances down nozzle 10, passing through orifice 22a in metal sheet 18 and into blind hole 124. The sudden arrest of the ultra high-pressure fluid pulse at the bottom of blind hole 124 results in a shock pressure pulse that acts upon the orifice 22a, producing a plastic radial strain around the orifice.

The equations for determining the stagnation pressure for a fluid jet that is suddenly arrested have been discussed in detail above. Ultra high-pressure fluid pulse generating tool 24a is able to create a 300 MPa pulse. The velocity of the pulse is preferably at least 775 m/s, and the shock pressure spike will have an amplitude of about 1100 MPa. The maximum tensile load around an internally pressurized orifice in an infinite solid is equal to the internal pressure. The yield strength for a range of metal alloys is listed below in Table 3. A shock pressure of 1100 MPa will cause permanent plastic strain in the region surrounding an orifice in all of the alloys listed in Table 3, resulting in improved fatigue life for the orifice.

TABLE 3

| Material | $\sigma_y$ (0.2%), MPa |
| --- | --- |
| 2024 Aluminum - T3 | 345 |
| 5083 Aluminum - H116 | 228 |
| 6061 Aluminum - T6 | 276 |
| 7050 Aluminum | 483 |
| 7075 Aluminum - T6 | 503 |
| A569 Mild Steel Sheet | 310 |
| A715 Grade 70, High Strength Steel Sheet | 550 |

Figure 15:
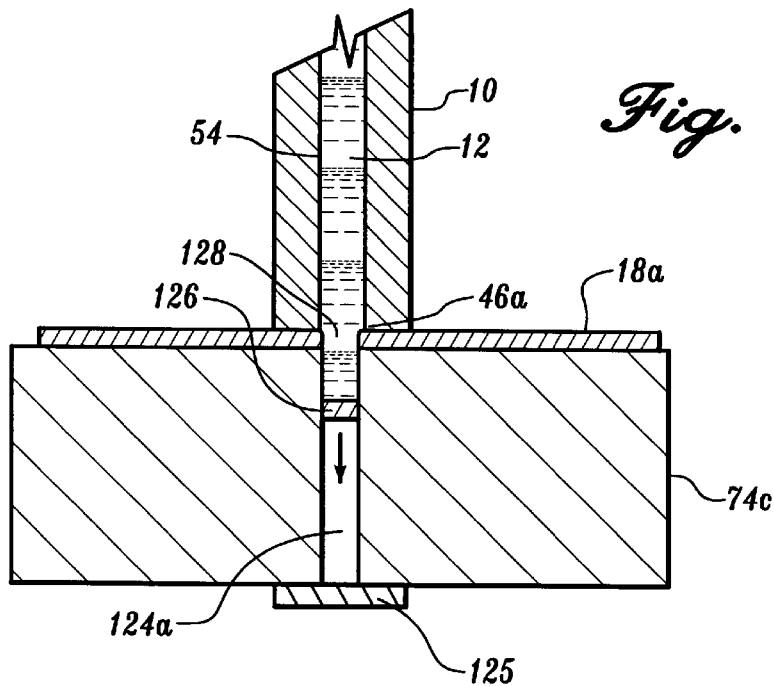
FIG. 15 is a schematic view of an ultra high-pressure fluid pulse being used to form a hole in a metal sheet, the pulse also cold working the hole immediately after it is formed.

FIG. 15 illustrates an embodiment in which an ultra high-pressure fluid pulse may be used to punch out a slug 126 to both form an orifice 128 in metal sheet 18a, as well as cold working the orifice in a single step. As shown, nozzle 10 and fluid channel 54 are used instead of the tapered embodiment, since the shock pressure (about 1100 Mpa) employed for forming and cold working an orifice should not be sufficiently great to require the use of a tapered nozzle and tapered fluid channel to increase the magnitude of the shock pulse. However, a tapered nozzle and tapered fluid channel may be used. This procedure is also implemented by abutting or seating nozzle outlet 46a substantially flush against metal sheet 18a, or at a slight standoff.

Metal sheet 18a is positioned over support structure 74c, which incorporates blind hole 124a. Ultra high-pressure fluid pulse 12 is used to punch slug 126 out of the metal sheet, thereby forming orifice 128 in the sheet. Ultra high-pressure fluid pulse 12 continues to advance metal slug 126 until metal slug 126 impacts the bottom of blind hole 124a. Blind hole 124a as shown extends through support structure 74c. A moveable block 125 is shown at the bottom of blind hole 124 and can be shifted away from the blind hole to allow slug 126 to be removed. It is contemplated that other methods, such as a spring device at the bottom of blind hole 124a, may also be used to remove slug 126. The arrest of ultra high-pressure fluid pulse 12 when the metal slug impacts the bottom of the blind hole produces a shock pressure pulse that imparts a compressive radial strain on the orifice formed in metal sheet 18a.

The hydraulic pressure required to punch an orifice in a sheet is simply related to the material yield strength, as indicated by:

$$P = 2t\sigma_y/d_h \tag{5}$$

where $d_h$ is the orifice diameter and t is the sheet thickness. The pressure required to punch a 0.5 inch diameter orifice in 0.1 inch thick mild steel sheet is about 124 MPa. The pressure required to form the orifice is substantially less than the jet stagnation pressure.

Cold Working Metal Surfaces Using Ultra High-Pressure Fluid Pulses

Still another aspect of the present invention duplicates the cold working effect that shot peening has on metal surfaces. The advantages of the surface impact treatment of metal parts by shot peening is well established. Shot peening occurs when steel or glass balls impact the surface at speeds that are sufficient to cause yielding in a surface layer of the material comprising the surface. The yielded metal is constrained by elasticity of the underlying material, so that a compressive residual stress with a magnitude approximately equal to the plastic flow stress occurs in the surface material. The distribution of stress beneath a stagnating jet has been discussed in detail previously. Table 4 shows the hydraulic pressure $P_{sp}$ required to induce deformation from the surface to a depth of twice the pressurized area diameter in a variety of metal alloys. The table provides a range of pressures that should induce plastic flow at a depth equal to approximately twice the pressurized area. The pressures listed in Table 4 for plastic flow of metal beneath a stagnating jet range from 1140 to 2750 MPa. These pressures are much higher than the stagnation pressure generated by conventional ultra-high-pressure pumps, which operate below 400 MPa. It is not feasible to generate a continuous water jet at pressures over 1 GPa, because of limitations of the materials from which pumps are fabricated, however, these pressures can be produced using an accelerated pulsed jet approach, as described above.

TABLE 4

| Material | $\sigma_p$, Mpa | $P_{sp}$, MPa |
|---|---|---|
| 2024 Aluminum - T3 | 345 | 1725 |
| 5083 Aluminum - H116 | 228 | 1140 |
| 6061 Aluminum - T6 | 276 | 1380 |

TABLE 4-continued

| Material | $\sigma_p$, Mpa | $P_{sp}$, MPa |
|---|---|---|
| 7050 Aluminum | 483 | 2415 |
| 7075 Aluminum - T6 | 503 | 2515 |
| A569 Mild Steel Sheet | 310 | 1550 |
| A715 Grade 70, High Strength Steel Sheet | 550 | 2750 |

The high-pressures required can be generated by abutting the discharge orifice of an ultra high-pressure fluid pulse generator against the component as discussed previously. This configuration may not be convenient when the component has a complex shape or adjacent to corners. The pulse may also be accelerated to produce a free jet with a stagnation pressure in excess of 1 GPa as discussed below.

The stagnation pressure of a free jet directed against a flat surface is:

$$P_s = \tfrac{1}{2}\Sigma_j v_j^2 \tag{6}$$

where $v$ is the jet velocity and $\rho$ is the density. Fluid jet pulses may be accelerated by forcing the pulses through a tapered nozzle, as noted above. When a high speed packet of liquid is extruded into a tapered nozzle, the leading edge of the pulse accelerates. This process has been used to generate hypervelocity jet pulses with stagnation pressures in excess of 4.5 GPa.

Figures 16A, 16B:
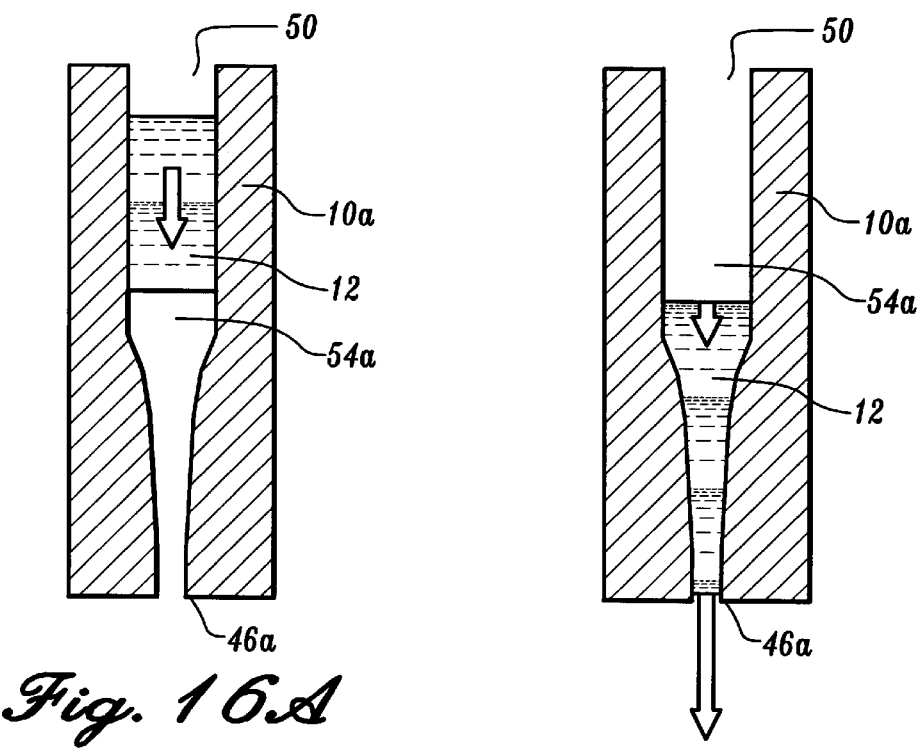
FIGS. 16A and 16B are schematic views showing a tapered nozzle that is used to accelerate a fluid packet to increase a magnitude of a pressure pulse.

FIGS. 16A and 16B illustrate how an ultra high-pressure fluid pulse 12 can be accelerated by forcing the pulse through a tapered nozzle 10a that defines a tapered fluid channel 54a. The tapered fluid channel includes nozzle inlet 50 and nozzle outlet 46a. Due to the tapered configuration of the fluid channel, nozzle inlet 50 has a larger diameter than nozzle outlet 46a. As fluid packet 12 advances through the nozzle, the leading edge of the pulse accelerates.

An analysis of the unsteady incompressible flow of a packet of water entering a tapered nozzle shows that the internal pressure developed inside an exponential or hyperbolic nozzle is much lower than the dynamic pressure of the jets. The relevant nozzle shape parameters are the area contraction ratio R and the ratio $\alpha$ of the nozzle length to the packet length:

$$R = \frac{A_o}{A_e} \text{ and } \alpha = \frac{L}{l} \tag{7}$$

where $A_o$ is the entrance area, $A_e$ is the exit area, L is the nozzle length, and l is the fluid packet length. The dynamic pressure amplification in an exponential nozzle is:

$$\frac{P_e}{P_o} = \frac{R \ln(R)}{\alpha} \tag{8}$$

while the peak internal pressure is only 25% of the exit dynamic pressure. (Even lower internal pressures can be obtained using hyperbolic nozzle designs).

Preferably, this method discharges ultra high-pressure fluid pulses through a tapered nozzle to generate free jet stagnation pressures that are high enough to cause plastic flow in a metal component, even when the nozzle outlet is located at a substantial standoff distance apart or away from the surface of the component. Generating a free jet stagnation pressure of 2750 MPa, which is sufficient to deform a high strength steel sheet, requires a tapered nozzle area ratio of 5.5 (assuming $P_o$=300 MPa and $\alpha$=1). In order to produce a 0.5 mm diameter jet, the pulse generator must produce a 1.2 mm diameter pulse. The tapered nozzle is preferably designed to leave sufficient energy in the trailing edge of the fluid packet to clear the nozzle before the next pulse occurs.

Preferably the energy of the pulse matches or exceeds the kinetic energy of shot used for peening. The kinetic energy of a 1 mm diameter steel shot moving at 50 m/s is only 0.01 J. A 300 MPa jet pulse has a velocity of 775 m/s. The kinetic energy of a 1 mm diameter, 1 mm long cylindrical droplet of water moving at this velocity would be about 0.16 J or 16 times greater. The internal nozzle pressure of the ultra high-pressure fluid pulse generator would be about 680 MPa. At this pressure, nozzle erosion may be a concern. Experimental nozzles may be constructed from high strength, corrosion resistant steel. For production applications, it would be preferable to use pre-stressed carbide or diamond nozzles.

Although the present invention has been described in connection with several preferred forms of practicing it, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for using a discrete volume of high-velocity liquid to join a plurality of components, comprising the steps of:
   (a) providing an ultra high-pressure fluid pulse generator capable of generating a discrete volume of high-velocity liquid, said ultra high-pressure fluid pulse generator comprising a valve that is capable of being rapidly opened, and an outlet adapted to direct said discrete volume of high-velocity liquid at one of the plurality of components to be joined;
   (b) positioning said plurality of components in a desired configuration;
   (c) positioning said ultra high-pressure fluid pulse generator so that the outlet is directed at a surface of said one of the plurality of components;
   (d) actuating said ultra high-pressure fluid pulse generator, thereby generating a discrete volume of high-velocity liquid, said discrete volume of high-velocity liquid being directed at one of the plurality of components to be joined by said outlet, wherein the step of generating the discrete volume of high-velocity liquid includes the step of rapidly opening said valve to release the discrete volume of high-velocity liquid through said outlet; and
   (e) generating a shock pressure by arresting a motion of said discrete volume of high-velocity liquid with the surface of said one of the plurality of components, said shock pressure having a magnitude sufficient to cause a localized deformation of at least said one of the plurality of components that joins and fastens said plurality of components together.

2. The method of claim 1, wherein said ultra high-pressure fluid pulse generator further comprises a tapered fluid channel, which increases a velocity of said discrete volume of high-velocity liquid, thereby increasing a magnitude of said shock pressure, said tapered fluid channel providing fluid communication between said valve and said outlet.

3. The method of claim 1, wherein said outlet of the ultra high-pressure fluid pulse generator substantially abuts the surface of said one of the plurality of components so that said discrete volume of high-velocity liquid is confined, thereby maximizing a magnitude of said shock pressure.

4. The method of claim 3, wherein the step of providing said ultra high-pressure fluid pulse generator comprises the step of providing a nozzle through which the discrete volume of high-velocity liquid is directed, and the step of positioning said ultra high-pressure fluid pulse generator comprises the step of positioning said nozzle such that said nozzle abuts the surface of said one of the plurality of components, further comprising the step of varying a length of the nozzle to determine a duration of the shock pressure.

5. The method of claim 4, wherein the step of providing further comprises the step of including a drain in said nozzle of said ultra high-pressure fluid pulse generator to enable any residual liquid to drain away after generating said discrete volume of high-velocity liquid and before generating a subsequent discrete volume of high-velocity liquid.

6. The method of claim 1, further comprising the step of draining said outlet of the ultra high-pressure fluid pulse generator of any residual liquid after generating said discrete volume of high-velocity liquid and before generating any subsequent discrete volume of high-velocity liquid.

7. The method of claim 1, wherein said one of the plurality of components comprises a fastener having a cavity that is essentially devoid of fluid, into which the discrete volume of high-velocity liquid is directed, others of said plurality of components including an orifice into which the fastener is disposed during the step of positioning the plurality of components, said discrete volume of high-velocity liquid and the shock pressure associated therewith causing the fastener to expand outwardly into an interference fit within the orifice to join and fasten the plurality of components together.

8. The method of claim 1, wherein said one of the plurality of components comprises a fastener having a cavity, others of said plurality of components including an orifice into which the fastener is disposed during the step of positioning the plurality of components, and wherein yet another of said plurality of components comprises a pin sized to fit within said cavity in said fastener, said shock pressure causing said pin to expand outwardly within the cavity, thereby expanding the cavity and causing the fastener to expand outwardly into an interference fit within the orifice to join and fasten the plurality of components together.

9. The method of claim 8, wherein the volume of said pin substantially equals an internal volume of the cavity of said fastener after the cavity has been expanded.

10. The method of claim 1, wherein said plurality of components includes a metal sheet.

11. The method of claim 1, wherein the shock pressure is generated using a liquid that comprises water.

12. The method of claim 1, further comprising the steps of:
   (a) forming openings in at least two of the plurality of components;
   (b) aligning said openings; and
   (c) inserting a fastener having a cavity formed therein into said openings that are aligned, said cavity being essentially devoid of fluid, wherein said step of positioning said ultra high-pressure fluid pulse generator includes the step of seating the outlet of said ultra high-pressure fluid pulse generator over the cavity of said fastener, so that said outlet is in fluid communication with the cavity in said fastener, wherein the step of actuating said ultra high-pressure fluid pulse generator includes the step of directing the discrete volume of high-velocity liquid into the cavity, wherein the step of generating a shock pressure includes the step of arresting a motion of said discrete volume of high-velocity liquid at a bottom of the cavity, said shock pressure causing said fastener to inelastically expand into interference with the openings in said at least a portion of the plurality of components.

13. The method of claim 12, further comprising the step of providing a fastener having a cavity with a diameter that is substantially smaller than a diameter of the fastener, thereby ensuring that an impact force of the shock pressure acting on the fastener is relatively small.

14. The method of claim 12, wherein the step of providing a fastener comprises the step of providing a fastener that is a rivet having a head that has a larger diameter than the openings.

15. The method of claim 13, wherein the step of generating the discrete volume of high-velocity liquid includes the step of controlling a velocity imparted to said discrete volume of high-velocity liquid, such that the impact force of the shock pressure acting on the fastener is sufficiently small that said plurality of components do not require support from a side of the plurality of components opposite said ultra high-pressure fluid pulse generator.

16. The method of claim 12, wherein a magnitude of said shock pressure expanding said fastener is greater than 1 GPa.

17. The method of claim 12, wherein a magnitude of said shock pressure expanding said fastener is sufficient to cause a plastic radial strain around said openings in at least a portion of the plurality of components, thereby increasing an expected fatigue life of said openings.

18. The method of claim 1, further comprising the steps of:
(a) forming openings in at least two of the plurality of components;
(b) aligning said openings;
(c) inserting a fastener having a cavity formed therein into said openings that are aligned;
(d) providing a pin sized to fit within the cavity wherein said step of positioning said ultra high-pressure fluid pulse generator includes the step of seating said outlet of said ultra high-pressure fluid pulse generator over the cavity of said fastener, with the pin disposed in said outlet and over the cavity in said fastener, and wherein the step of actuating said ultra high-pressure fluid pulse generator includes the step of directing the discrete volume of high-velocity liquid against the pin, thereby driving said pin into said cavity, and wherein the step of generating a shock pressure includes the step of arresting a motion of said discrete volume of high-velocity liquid with said pin so that the resulting shock pressure deforms the pin within the cavity, deformation of the pin causing said fastener to inelastically expand into interference with the openings in said at least a portion of the plurality of components.

19. The method of claim 18, wherein a volume of said pin is selected so as to substantially equal a volume of the cavity after the cavity has been expanded by the deforming pin.

20. The method of claim 18, wherein the fastener and the pin comprise one of an alloy containing aluminum, an alloy containing titanium, and an alloy containing both aluminum and titanium.

21. The method of claim 1, wherein said shock pressure causes a plastic deformation at an interface between at least two of the plurality of components, further comprising the step of providing a structure to support said at least two of the plurality of components.

22. The method of claim 21, wherein a magnitude of the shock pressure is greater than 1 GPa.

23. The method of claim 21, wherein the step of providing the ultra high-pressure fluid pulse generator includes the step of providing a nozzle having a diameter that is substantially between one and two times the thickness of a component of the at least two components that is disposed closest to said nozzle, and the step of causing a localized deformation includes the step of ensuring that said plastic deformation is disposed at the interface between said at least two components, thereby bonding said at least two components together.

24. The method of claim 21, wherein at the interface between the at least two of the plurality of components, a surface of at least one of said at least two of the plurality of the components is substantially smooth.

25. The method of claim 21, wherein at the interface between the at least two of the plurality of components, a surface of at least one of the at least two of the plurality of components is textured to facilitate bonding between the at least two of the plurality of components.

26. The method of claim 21, wherein at the interface between the at least two of the plurality of components, a surface of at least one of the at least two of the plurality of components includes a cavity, so that an impulsive loading applied to the interface above the cavity by the shock pressure forms a tack joint.

27. The method of claim 21, wherein at the interface between the at least two of the plurality of components, a surface of at least one of the at least two of the plurality of components includes a channel, so that an impulsive loading applied above the channel by the shock pressure forms a seam.

28. The method of claim 21, further comprising the step of disposing an intermediate material at the interface between the at least two of the plurality of components, to enhance bonding between the at least two of the plurality of components in response to the shock pressure.

29. The method of claim 28, wherein the intermediate material is sufficiently hard so that the shock pressure causes the intermediate material to interpenetrate surfaces of the at least two of the plurality of components, forming a mechanical joint.

30. The method of claim 28, wherein the intermediate material is a powder which, upon being subjected to an impulsive loading produced by the step of generating said shock pressure, melts, causing a localized melting of said at least two of the plurality of components, thereby bonding surfaces of the at least two of the plurality of components together.

31. The method of claim 30, wherein the powder comprises ceramic particles.

32. The method of claim 30, wherein the powder comprises metal particles.

33. The method of claim 1, further comprising the step of providing a cavity disposed behind a rear component, opposite a point on the surface of said one of the plurality of components where said discrete volume of high-velocity liquid is arrested, wherein said shock pressure forces said plurality of components into the cavity to form an interlocking clinch fastening.

34. The method of claim 33, wherein said shock pressure produced by said discrete volume of high-velocity liquid has a magnitude greater than 500 MPa.

35. The method of claim 33, wherein the discrete volume of high-velocity liquid is directed to an area that is not greater than that of an inlet into the cavity to encourage thinning of a center of the interlocking clinch fastening and formation of a thick-walled interlock, with minimum shear in a load bearing section of the interlocking clinch fastening.

36. The method of claim 33, wherein the cavity is formed in a supporting structure that underlies the plurality of components being joined.

37. The method of claim 36, wherein said cavity is in a die that is mounted on the supporting structure.

38. A method for using a discrete volume of high-velocity liquid to join a plurality of components, comprising the steps of:

(a) providing an ultra high-pressure fluid pulse generator capable of generating a discrete volume of high velocity liquid, said ultra high-pressure fluid pulse generator having an outlet adapted to direct said discrete volume of high-velocity liquid at one of the plurality of components to be joined;

(b) positioning said plurality of components in a desired configuration;

(c) positioning said ultra high-pressure fluid pulse generator so that the outlet is directed at a surface of said one of the plurality of components;

(d) actuating said ultra high-pressure fluid pulse generator, thereby generating a discrete volume of high-velocity liquid, said discrete volume of high-velocity liquid being directed at one of the plurality of components to be joined by said outlet; and (e) generating a shock pressure by arresting a motion of said discrete volume of high-velocity liquid with the surface of said one of the plurality of components, said shock pressure having a magnitude sufficient to cause a localized deformation of at least said one of the plurality of components that joins and fastens said plurality of components together.

39. The method of claim 38, wherein the step of providing comprises the step of providing a valve that is capable of rapidly opening to provide a discrete volume of high-velocity liquid, and wherein said ultra high-pressure fluid pulse generator generates the discrete volume of high-velocity fluid by rapidly opening said valve to release the discrete volume of high-velocity fluid through said outlet.

40. A method for using a discrete volume of high-velocity liquid to join a plurality of components, comprising the steps of:

(a) providing:
(i) an ultra high-pressure fluid pulse generator capable of generating a discrete volume of high-velocity liquid, said ultra high-pressure fluid pulse generator having an outlet adapted to direct said discrete volume of high-velocity liquid at one of the plurality of components to be joined; and
(ii) a cavity disposed behind a rear component, opposite a point where the discrete volume of high-velocity liquid is to be directed;

(b) positioning said plurality of components in a desired configuration, such that said cavity is positioned opposite a point where the discrete volume of high-velocity liquid is to be directed;

(c) positioning said ultra high-pressure fluid pulse generator so that the outlet is directed at a surface of said one of the plurality of components, such that said discrete volume of high-velocity liquid will be directed to a location on said surface that is opposite said cavity;

(d) actuating said ultra high-pressure fluid pulse generator, thereby generating a discrete volume of high-velocity liquid, said discrete volume of high-velocity liquid being directed by said outlet toward said location opposite said cavity on one of the plurality of components to be joined; and (e) generating a shock pressure by arresting a motion of said discrete volume of high-velocity liquid with the surface of said one of the plurality of components, said shock pressure having a magnitude sufficient to force said plurality of components into said cavity to form an interlocking clinch fastening.

41. The method of claim 40, wherein said shock pressure produced by arresting said discrete volume of high-velocity liquid has a magnitude greater than 500 MPa.

42. The method of claim 40, wherein the discrete volume of high-velocity liquid is applied to an area that is not greater than that of an inlet into the cavity to encourage thinning of a center of the interlocking clinch fastening and formation of a thick-walled interlock, with minimum shear in a load bearing section of the interlocking clinch fastening.

43. The method of claim 40, wherein the cavity is formed in a supporting structure that underlies the plurality of components being joined.

44. The method of claim 43, wherein said cavity is formed in a die that is mounted on the supporting structure.

* * * * *